US008243249B2

(12) United States Patent  
Asuke

(10) Patent No.: US 8,243,249 B2  
(45) Date of Patent: Aug. 14, 2012

(54) METHOD OF MANUFACTURING LIQUID CRYSTAL DEVICE

(75) Inventor: Shintaro Asuke, Suwa (JP)

(73) Assignee: Seiko Epson Corporation (JP)

( * ) Notice: Subject to any disclaimer, the term of this patent is extended or adjusted under 35 U.S.C. 154(b) by 530 days.

(21) Appl. No.: 12/498,641

(22) Filed: Jul. 7, 2009

(65) Prior Publication Data

US 2010/0006538 A1 Jan. 14, 2010

(30) Foreign Application Priority Data

Jul. 10, 2008 (JP) ................. 2008-180393

(51) Int. Cl.
 *G02F 1/13* (2006.01)
 *G02F 1/1337* (2006.01)
(52) U.S. Cl. ............... 349/187; 349/123; 428/1.2
(58) Field of Classification Search .......... 349/123, 349/125, 187; 428/1.2, 1.21; 427/78
 See application file for complete search history.

(56) References Cited

FOREIGN PATENT DOCUMENTS

JP 2007-127757 5/2007

*Primary Examiner* — Thoi Duong

(74) *Attorney, Agent, or Firm* — Harness, Dickey & Pierce, P.L.C.

(57) ABSTRACT

A method of manufacturing a liquid crystal device provided with a liquid crystal layer held between a pair of substrates opposed to each other, and an oriented film disposed between at least one of the substrates and the liquid crystal layer, includes: (a) providing an inorganic oriented film to the one of the substrates; (b) forming a first organic film with a first silane-coupling agent, the first organic film randomly covering a surface of the inorganic oriented film with a predetermined coverage factor smaller than 1; and (c) forming, after step (b), a second organic film with a second silane-coupling agent having a carbon number different from a carbon number of the first silane-coupling agent, the second organic film covering the surface exposed from the first organic film, thereby forming the oriented film composed mainly of the first organic film, the second organic film, and the inorganic film.

6 Claims, 3 Drawing Sheets

METHOD OF MANUFACTURING LIQUID CRYSTAL DEVICE

The entire disclosure of Japanese Patent Application No. 2008-180393, filed Jul. 10, 2008 is expressly incorporated by reference herein.

BACKGROUND

1. Technical Field

The present invention relates to a method of manufacturing a liquid crystal device.

2. Related Art

Since the past, liquid crystal devices have widely been used as display sections of personal computers, cellular phones, and so on, or light valves or the like of projectors. The liquid crystal device is provided with, for example, a liquid crystal layer held between a pixel electrode and a common electrode, an oriented film for controlling the orientation of the liquid crystal molecules of the liquid crystal layer, and so on. When an electrical field is applied to the liquid crystal layer, the direction angles of the liquid crystal molecules vary, and the polarization state of the light passing through the liquid crystal layer is changed. Thus, a part of the light having passed through the liquid crystal layer is absorbed by a polarization plate to turn out to be the light with a predetermined grayscale, which is then emitted from the liquid crystal device.

Incidentally, as the oriented film described above, there has been known a polymer film made of polyimide processed with a rubbing treatment. By providing the orientation with rubbing treatment, the oriented film can easily be formed. However, there are problems such as difficulty in obtaining uniform orientation or in partially controlling the orientation, display defects easily caused by rubbing mark or generation of dust from rubbing cloth, or degradation of yield by generation of damage in the oriented film due to excessive rubbing treatment. Further, in the equipment, such as a liquid crystal projector, using a high-power light source, an organic substance such as polyimide is decomposed with absorption of the source light or the absorption heat thereof, thereby causing degradation in characteristic of the equipment or reduction of life span of the equipment in some cases.

In order for solving such problems, it is effective to use an oriented film made of an inorganic material (hereinafter referred to as an inorganic oriented film) instead of the oriented film made of an organic material. However, if the inorganic oriented film is used, a moisture-proof property is degraded due to the fact that there exist a lot of polarized hydroxyl groups on the surface thereof or that the film has a porous surface and has low adhesiveness with a seal material. From a viewpoint of improving the moisture-proof property, a hybrid oriented film formed of an inorganic material and an organic material has also been proposed (e.g., JP-A-2007-127757 (referred to as Document 1)).

According to the Document 1, an inorganic oriented film is formed, and then an alkyl group (an organic substance) is coupled on the surface of the inorganic oriented film by executing a surface treatment with a silane-coupling agent on the surface of the inorganic oriented film. Further, two types of silane-coupling agents with molecular weight different from each other are used so that the gap caused by the steric barrier of the alkyl group with greater molecular weight is filled with the alkyl group with smaller molecular weight. Thus, since the surface of the inorganic oriented film is covered by a dense organic film, water repellency thereof is improved, and the adhesiveness with the seal member is also improved.

According to the technology of the Document 1, although the moisture-proof property of the liquid crystal device can dramatically be improved, the characteristics required for the oriented film vary since the liquid crystal devices are used in various devices, and therefore, there are some points to be improved for obtaining the oriented film with desired characteristics.

If the surface treatment with the silane-coupling agent is executed on the inorganic oriented film as described in the Document 1, other characteristics than the water repellency, light resistance and orientation are also varied. Such a characteristic variation depends mainly on the carbon number of the alkyl group coupled to the surface of the inorganic oriented film, and therefore, if the type of the silane-coupling agent is determined, the characteristic of the oriented film is specified. Therefore, in order for obtaining a desired characteristic, it is required to appropriately select the silane-coupling agent, and research and experiments for the selection require a large amount of labor. Further, since the carbon number is a natural number, it is difficult to continuously vary the characteristic of the oriented film, and there is also a disadvantage that the characteristic cannot finely be controlled.

SUMMARY

An advantage of the invention is to provide a method of manufacturing a liquid crystal device while preferably controlling characteristic of an oriented film.

A method of manufacturing a liquid crystal device according to the invention is a method of manufacturing a liquid crystal device provided with a liquid crystal layer held between a pair of substrates opposed to each other, and an oriented film disposed between at least one of the substrates and the liquid crystal layer. The method includes the steps of (a) providing an inorganic oriented film to the one of the substrates, (b) forming a first organic film with a first silane-coupling agent, the first organic film randomly covering a surface of the inorganic oriented film with a predetermined coverage factor smaller than 1, and (c) forming, after step (b), a second organic film with a second silane-coupling agent having a carbon number different from a carbon number of the first silane-coupling agent, the second organic film covering the surface exposed from the first organic film, thereby forming the oriented film composed mainly of the first organic film, the second organic film, and the inorganic film.

According to the process described above, by controlling the coverage factor of the first organic film in step (b), it becomes possible to control the proportion between the first organic film and the second organic film in the oriented film. The characteristic of the oriented film thus formed becomes a characteristic between the characteristic in the case of forming the oriented film only with the first organic film and the characteristic in the case of forming the oriented film only with the second organic film, and corresponding to the proportion. Therefore, by figuring out the characteristic in the case of forming the oriented film only with the first organic film and the characteristic in the case of forming the oriented film only with the second organic film, and controlling the proportion, the oriented film with a desired characteristic can be obtained. Therefore, it becomes possible to dramatically reduce the burden of selecting the silane-coupling agent in order for obtaining a desired characteristic, and to obtain the oriented film with a characteristic not achievable using a single type of existing silane-coupling agent, thus it becomes possible to make it easy to manufacture the liquid crystal device capable of coping with various devices.

Further, step (b) may include (b1) reacting the first silane-coupling agent with the surface, (b2) partially removing an organic film formed in step (b1) to form the first organic film, and (b3) controlling treatment condition in step (b2) to control an amount of removal, thereby setting the predetermined coverage factor of the organic film.

Depending of the type of the silane-coupling agent, there may be some cases in which the organic film initially formed on the inorganic oriented film acts as a starting point to form a network in the surface direction. In such cases, there may be some cases in which it is difficult to form the first organic film with a highly accurate coverage factor only by the surface treatment with the silane-coupling agent. According to the process described above, since the coverage factor of the first organic film is controlled by controlling the process condition of the removal process, it becomes unnecessary to consider the coverage factor in the surface treatment. Therefore, the first silane-coupling agent can be reacted up to the saturated amount, thus a uniform organic film can be formed. On the other hand, since in the removal process the chemical reaction is caused at random locations in the organic film, by controlling the process conditions, the amount of removal of the organic film can be controlled. Therefore, it is possible to remove a predetermined amount of organic film from the uniform organic film, thus the coverage factor can be made highly accurate.

Further, in step (b), a reaction condition for reacting the first silane-coupling agent with a surface of the inorganic oriented film may be controlled, thereby setting the predetermined coverage factor of the first organic film.

According to the process described above, the removal process can be eliminated from the case of controlling the coverage factor by partially removing the organic film, the man-power can be reduced, thus improving the productivity.

Further, it is also possible that in step (b2), the organic film is irradiated with an ultraviolet ray to partially remove the organic film, and at least one of irradiation intensity of the ultraviolet ray and irradiation time of the ultraviolet ray is controlled, thereby controlling the amount of the removal.

According to the process described above, by applying the ultraviolet ray, the bond between the organic group of the first silane-coupling agent and the inorganic oriented film is broken, and the organic film is removed. Further, by controlling at least one of the irradiation intensity and the irradiation time of the ultraviolet ray, the amount of the removal can be controlled with high accuracy, thus the first organic film with a predetermined coverage factor can be formed.

Further, it is also possible that in step (b2), the organic film is exposed to an ozone atmosphere to partially remove the organic film, and at least one of gas concentration of the ozone atmosphere and a period of time during which the organic film is exposed to the ozone atmosphere is controlled, thereby controlling the amount of the removal.

According to the process described above, by being exposed to the ozone atmosphere, the bond between the organic group of the first silane-coupling agent and the inorganic oriented film is broken, and the organic film is removed. Further, by controlling at least one of the gas concentration of the ozone atmosphere and the period of time during which the organic film is kept exposed to the ozone atmosphere, the amount of the removal can be controlled with high accuracy, thus the first organic film with a predetermined coverage factor can be formed.

Further, it is also possible that in step (b2), the organic film is exposed to a plasma atmosphere to partially remove the organic film, and at least one of gas concentration of the plasma atmosphere and a period of time during which the organic film is exposed to the plasma atmosphere is controlled, thereby controlling the amount of the removal.

According to the process described above, by being exposed to the plasma atmosphere, the bond between the organic group of the first silane-coupling agent and the inorganic oriented film is broken, and the organic film is removed. Further, by controlling at least one of the plasma density of the plasma atmosphere and the period of time during which the organic film is kept exposed to the plasma atmosphere, the amount of the removal can be controlled with high accuracy, thus the first organic film with a predetermined coverage factor can be formed.

Further, it is also possible that in step (b), the first silane-coupling agent is reacted with the surface using a liquid-phase method.

By reacting it using the liquid-phase method, it is possible to react the first silane-coupling agent with the treatment apparatus having a simpler configuration than in the case of reacting it using the gas-phase method, thus the initial cost can be reduced. Further, it is also possible to improve the productivity compared to the case of reacting it using the gas-phase method. Further, in the case in which the first silane-coupling agent has a high boiling point, and is liquid at ordinary temperature, it is possible to preferably react the first silane-coupling agent without evaporation compared to the case of reacting it using the gas-phase method. As described above, the advantage of the invention can be obtained even in the case of selecting the first silane-coupling agent with a high boiling point, the freedom of selecting the first silane-coupling agent increases.

Further, it is also possible that in step (b), the first silane-coupling agent is reacted with the surface using a gas-phase method.

Further, in the case in which the first silane-coupling agent has a low boiling point, and is gas at ordinary temperature, it is possible to preferably react the first silane-coupling agent without devolatilization or bringing it into solution compared to the case of reacting it using the liquid-phase method. As described above, the advantage of the invention can be obtained even in the case of selecting the first silane-coupling agent with a low boiling point, the freedom of selecting the first silane-coupling agent increases.

BRIEF DESCRIPTION OF THE DRAWINGS

The invention will now be described with reference to the accompanying drawings, wherein like numbers reference like elements.

DESCRIPTION OF AN EXEMPLARY EMBODIMENT

Figure 1A:
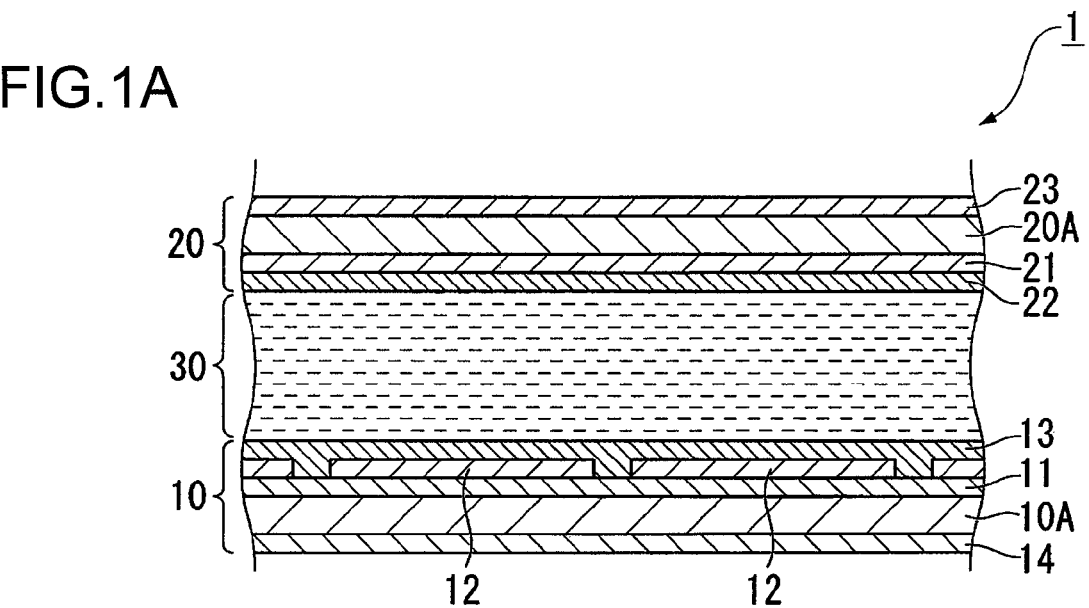
FIG. 1A is a cross-sectional view showing an example of a liquid crystal device.

Although an embodiment of the invention will hereinafter be explained, the technical scope of the invention is not at all limited to the following embodiment. Although in the following explanations various structures are exemplified with reference to the drawings, for the sake of easy understanding of characteristic portions of the structure, the structure in the drawings may be illustrated with the size or the scale different from the actual structure. Prior to a method of manufacturing a liquid crystal device of the present embodiment, an example of the liquid crystal device manufactured with the present invention will firstly be explained.

Figure 1B:
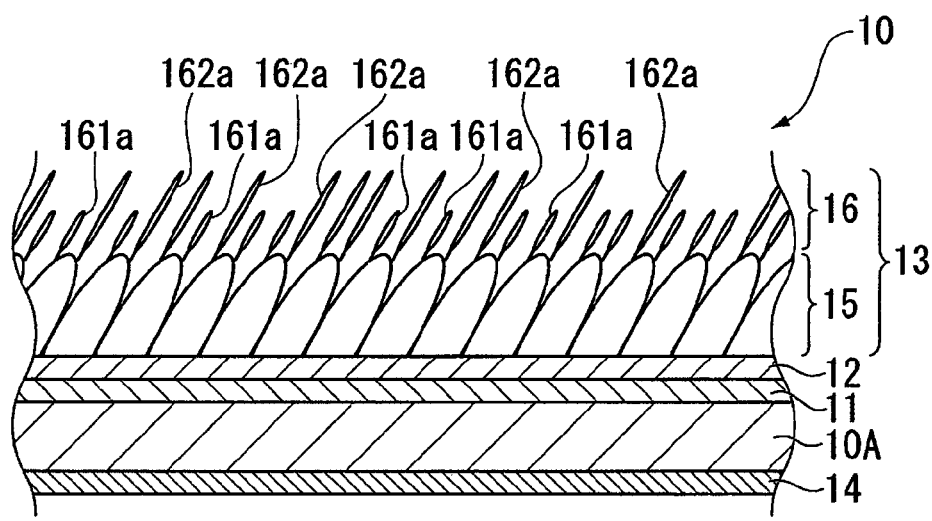
FIG. 1B is a schematic diagram of an oriented film.

FIG. 1A is a cross-sectional view showing an example of the liquid crystal device manufactured using the invention, and FIG. 1B is a schematic diagram enlargedly showing an oriented film. As shown in FIG. 1A, the liquid crystal device 1 of the present embodiment is provided with an element substrate 10 (one substrate), an opposed substrate 20 disposed so as to be opposed to the element substrate 10, and a liquid crystal layer 30 held between these substrates. The liquid crystal device 1 of the present embodiment is of a transmissive type having the light entrance side on the opposed substrate 20 side, and the light exit side on the element substrate 10 side.

The element substrate 10 is of an active matrix type formed using, for example, a transparent substrate 10A as a base member. The transparent substrate 10A is provided with an element formation layer 11 on the liquid crystal layer 30 side. Although a detailed structure of the element formation layer 11 is not shown in the drawings, the element formation layer 11 includes a switching element such as a thin film transistor (TFT), and various types of wiring such as a data line or a scan line. The TFT is electrically connected to a supply source of an image signal via the data line, and is electrically connected to a supply source of the control signal via the scan line. The element formation layer 11 is provided with discrete pixel electrodes 12 on the liquid crystal layer 30 side, and the pixel electrodes 12 are electrically connected to the TFT. A first oriented film 13 (an oriented film) is disposed so as to cover the element formation layer 11 and the pixel electrodes 12. Further, the transparent substrate 10A is provided with a polarization plate 14 on the opposite side thereof to the liquid crystal layer 30.

The opposed substrate 20 has a transparent substrate 20A as a base member, and the transparent substrate 20A is provided with a sheet like common electrode 21 on the liquid crystal layer 30 side. The common electrode 21 is provided with a second oriented film 22 on the liquid crystal layer 30 side. The transparent substrate 20A is provided with a polarization plate 23 on the opposite side thereof to the liquid crystal layer 30.

The first oriented film 13 and the second oriented film 22 are for controlling the orientation of the liquid crystal molecules in the liquid crystal layer 30, and will be described later in detail.

In the liquid crystal device 1 having the configuration described above, when the control signal is transmitted to the TFT of the element formation layer 11, the TFT is switched on to transmit the image signal to the pixel electrode 12. Then, an electrical field corresponding to the image signal is applied between the pixel electrode 12 and the common electrode 21, and the electrical field controls the angle of orientation of the liquid crystal molecules. The light entering from the opposed substrate 20 in such a condition is formed to be linear polarized light by the polarization plate 23, and modulated by the liquid crystal layer 30 to be varied in the polarization state. The light thus modulated is partially absorbed by the polarization plate 14 in accordance with the polarization state to be formed as the light representing a predetermined grayscale, and then emitted from the element substrate 10 side.

As shown in FIG. 1B, the first oriented film 13 is composed of an inorganic oriented film 15 and an organic section 16. The organic section 16 is formed by executing a surface treatment on the inorganic oriented film 15 with a plurality of silane-coupling agents having molecular weight different from each other. Here, as the plurality of silane-coupling agents, two types of silane-coupling agents, namely first and second silane-coupling agents are used, and the organic section 16 is composed of a first organic film made of a first alkyl group 161$a$ derived from the first silane-coupling and a second organic film made of a second alkyl group 162$a$ derived from the second silane-coupling. The carbon number of the first alkyl group 161$a$ is in a range of, for example, 4 through 6, while the carbon number of the second alkyl group 162$a$ is in a range of, for example, 10 through 18.

The surface of the inorganic oriented film 15 is partially and randomly covered by the first organic film. The part of the surface of the inorganic oriented film 15 not covered by the first organic film is covered by the second organic film. The first oriented film 13 has a controlled coverage factor of the first organic film in the surface of the inorganic oriented film 15, thereby specifying the coverage factor of the second organic film. In the present embodiment, the second oriented film 22 has substantially the same configuration as that of the first oriented film 13, and the organic section thereof is composed of the first organic film made of the first alkyl group and the second organic film made of the second alkyl group.

The coverage factor mentioned here denotes the ratio between a saturated amount (number) of predetermined alkyl groups allowed to be coupled to the surface of the inorganic oriented film and the amount (number) of predetermined alkyl groups actually coupled thereto. The coverage factor can be measured by, for example, evaluating the contact angle. For example, the surface treatment with the silane-coupling agent is sufficiently executed on the inorganic oriented film, thereby making the alkyl groups be coupled up to the saturated amount. Subsequently, the contact angle with respect to, for example, water is measured, and then the total amount of the carbon included in the alkyl group is measured using the mass analysis or the like. Thus, the contact angle with the coverage factor of 100% is obtained. Further, the contact angle and the total amount of carbon are measured while controlling the amount of alkyl groups, which has been coupled, by varying treatment conditions of the surface treatment. By comparing the total amount of the carbon thus obtained with the case in which the coverage factor is 100%, the coverage factor can be obtained and at the same time related to the contact angle. Since the coverage factor can be obtained by measuring the contact angle if the correlation between the coverage factor and the contact angle has been thus studied, it becomes easy to correlate, for example, treatment conditions of the surface treatment and the coverage factor with each other.

The characteristic of the first oriented film 13 is obtained by considering the characteristic of the organic section 16 and the characteristic of the inorganic oriented film 15. The characteristic of the organic section 16 is obtained as the characteristic between the characteristic of the pure first organic film and the characteristic of the pure second organic film in accordance with the ratio between the first alkyl group 161$a$ and the second alkyl group 162$a$. For example, if the organic film is made only of a single type of alkyl group, the characteristic of the organic film is almost specified by the carbon number of the alkyl group. Since the carbon number is a natural number, it is not possible to finely control the characteristic of the organic film even by selecting the type of the alkyl group to vary the carbon number.

However, in the first oriented film 13 of the present embodiment, the characteristic thereof is controlled with high accuracy by controlling the ratio between the first alkyl group 161a and the second alkyl group 162a to be a desired characteristic.

As the characteristic to be controlled, which can appropriately be selected in accordance with the usage of the device the liquid crystal device 1 is applied to, water repellency (moisture-proof property), light resistance, orientation, and so on can be cited. From the viewpoint of improving the water repellency, it is enough to raise the proportion of the alkyl group (here, the second alkyl group 162a) with a larger carbon number among the first and second alkyl groups. From the viewpoint of ensuring the light resistance, it is sufficient to raise the proportion of one (here, the first alkyl group 161a) with a smaller carbon number. From the viewpoint of controlling the orientation, the pretilt angle of the liquid crystal molecules can be enlarged by raising the proportion of one with a smaller carbon number, while the pretilt angle thereof can be made smaller by raising the proportion of one with a larger carbon number.

As described above, since the characteristics of the first oriented film 13 and the second oriented film 22 are controlled with high accuracy in accordance with the usage of the device in the liquid crystal device 1, a preferable liquid crystal device capable of configuring a high performance device can be obtained.

Then, based on the liquid crystal device 1, an embodiment of a method of manufacturing a liquid crystal device will be explained.

Figure 2A:
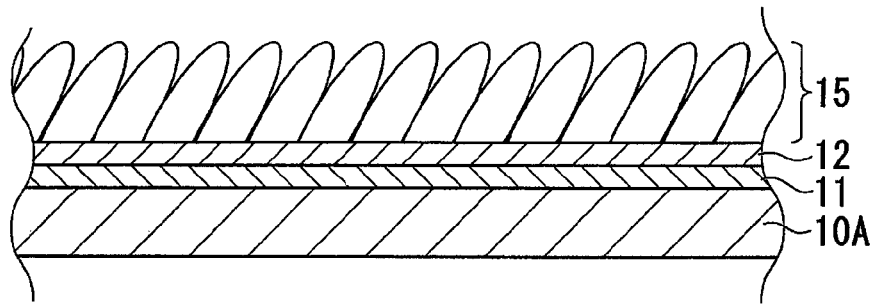
FIGS. 2A through 2D are process charts showing a method of manufacturing the liquid crystal device of the present embodiment.

FIGS. 2A through 2D are process charts schematically showing a method of manufacturing the liquid crystal device of the present embodiment. Firstly, as shown in FIG. 2A, after forming the element formation layer 11 and the pixel electrodes 12 on the transparent substrate 10A in this order, the inorganic oriented film 15 is formed on the pixel electrodes 12, and then the surface of the inorganic oriented film 15 is rinsed. It is possible to form the element formation layer 11 and the pixel electrodes 12 using formation materials and formation methods known to the public. It is possible to form the inorganic oriented film 15 by depositing a silicon oxide using an oblique sputtering method, an oblique evaporation method, and so on.

Figure 2B:
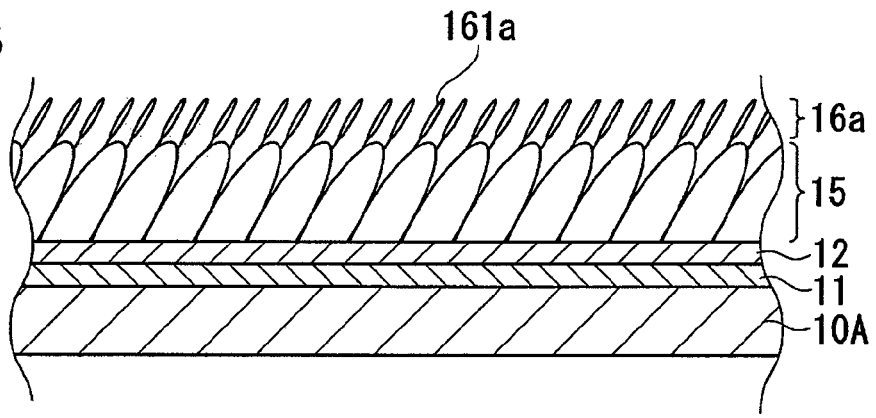

Subsequently, in the present embodiment, the first alkyl group 161a is coupled to the surface of the inorganic oriented film 15 up to the saturated amount, thereby forming the organic film 16a as shown in FIG. 2B. As the formation method of the organic film 16a, there can be cited a surface treatment of reacting the first silane-coupling agent using a gas-phase method, a surface treatment of reacting the first silane-coupling agent using a liquid-phase method, and so on.

As the first and second silane-coupling agents, there can be used an organic compound to be coupled to the inorganic oriented film 15 via a covalent bond. Specifically, those having the molecular structures expressed by the formula (1) described below. In the formula (1), Y denotes an absorption group, $R^1$ and $R^2$ denote organic groups, $X^1$ denotes a hydrolyzable group such as $-OR^2$, $-Cl$, or $-OH$, $R^2$ denotes an alkyl group with a carbon number of 1 through 4, and a denotes an integer of 1 through 3.

$$R^1 Y X^1_a R^2_{(3-a)} \quad (1)$$

The absorption region Y described above is not particularly limited, but is preferably one or more species selected from a silyl group (—Si≡), a titanyl group (—Ti≡), and a stanyl group (—Sn≡).

For example, as the absorption region including the silyl group, there can be cited a silanol group (—Si(OH)$_3$), a trichlorosilyl group (—SiCl$_3$), triethoxysilyl group (—Si(OCH$_2$CH$_3$)$_3$), a trimethoxysilyl group (—Si(OCH$_3$)$_3$), and so on.

As the structure of the absorption region Y, the hydrolyzable group $X^1$, and organic group $R^2$, a structure replaced with a structure including a hydrolyzable group such as a thiol group (—SH), a hydroxyl group (—OH), an amino group (—NH$_2$), a phosphate group (—PO$_3$H$_2$), a carboxyl group (—COOH), a sulfonate group (—SO$_3$H), a phosphorochloridate group (—PO$_2$Cl$_2$), a carboxyl chloride group (—COCl), and a sulfonyl chloride group (—SO$_2$Cl) can be adopted.

The organic group $R^1$ constituting the formula (1) corresponds, for example, to an alkyl group, an alkenyl group, an aryl group, and an aralkyl group, the hydroxyl group included in the molecular structure can be substituted by an amino group, a carboxyl group, a hydroxyl group, a thiol group, a fluorine atom, and so on, and further, it is possible that a heteroatom such as —O—, —S—, —NH—, or —N≡, or an aromatic cycle such as benzene is inserted in the carbon chain. As specific examples of the organic group $R^1$, there can be exemplified a phenyl group, a benzyl group, a phenethyl group, a hydroxyphenyl group, a chlorophenyl group, an aminophenyl group, a naphthyl group, an anthrenyl group, a pyrenyl group, a thienyl group, a pyrrolyl group, a cyclohexyl group, a cyclohexenyl group, a cyclopentyl group, a cyclopentenyl group, a pyridinyl group, a methyl group, an ethyl group, an n-propyl group, an isopropyl group, an n-butyl group, an isobutyl group, an sec-butyl group, a tert-butyl group, an octadecyl group, an n-octyl group, a chloromethyl group, a methoxyethyl group, a hydroxyethyl group, an aminoethyl group, a cyano group, a mercaptopropyl group, a vinyl group, an allyl group, an acryloxyethyl group, a methacryloxyethyl group, a glycidoxypropyl group, acetoxy group, and so on. It is a functional group for forming an alkoxy group or a chlorine radical of the $X^1$, a Si—O—Si bond, and so on, and is hydrolyzed with water to leave as alcohol or acid. As the alkoxy group, there can be cited, for example, a methoxy group, an n-propoxy group, an isopropoxy group, an n-butoxy group, an isobutoxy group, an sec-butoxy group, and a tert-butoxy group.

As a specific example of the first and second silane-coupling agents, those described in paragraph 0023 of JP-A-2006-35066 filed by the same assignee can be cited.

Figure 3A:
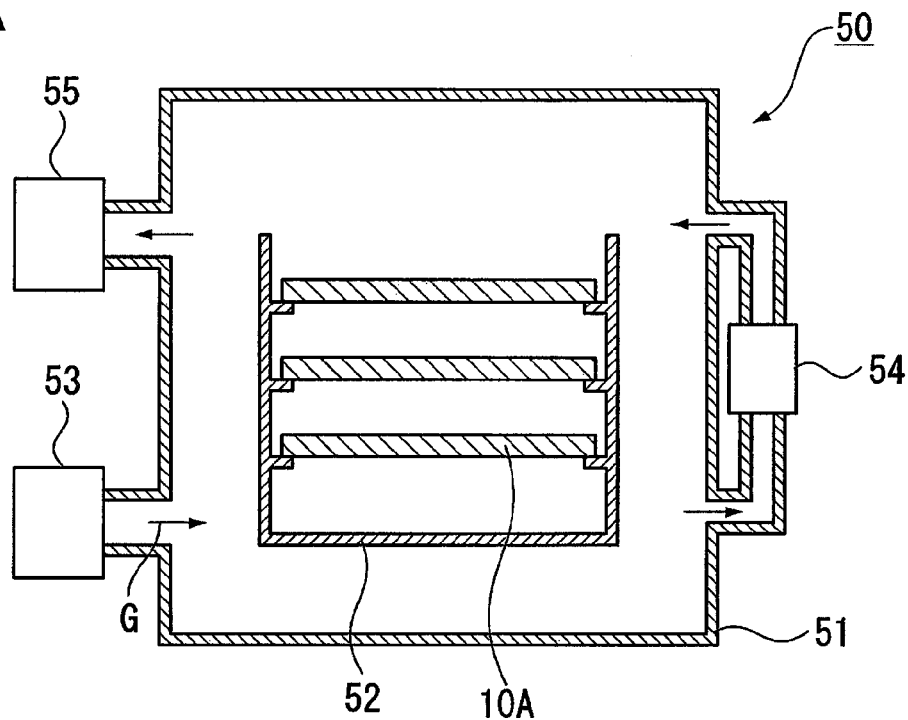
FIG. 3A is a schematic diagram showing a surface treatment method using a gas-phase method.

FIG. 3A is a schematic diagram showing a surface treatment method using a gas-phase method. Here, an example of executing the surface treatment using a treatment apparatus 50 shown in FIG. 3A will be explained. The treatment apparatus 50 is provided with a reaction container 51, a substrate holding section 52 housed in the reaction container 51, a reaction gas supply section 53, a gas circulator 54, an exhauster 55, and so on.

The reaction container 51 is provided with a temperature control device (not shown) such as a heater so that the ambient temperature in the reaction container 51 can be controlled. The reaction gas supply section 53 is arranged to evaporate the solution including the silane-coupling agent to generate the reaction gas, and supply the mixed gas G of the reaction gas and a carrier gas into the reaction container 51. It is arranged that the molar quantity (concentration) of the silane-coupling agent contained in a unit volume of the reaction gas, the flow rate of the reaction gas supplied, and so on can be controlled in the reaction gas supply section 53. The gas circulator 54 is arranged to circulate the ambient gas in the reaction container 51. The exhauster 55 is arranged to exhaust the ambient gas in the reaction container 51, thus the pressure in the reaction container 51 can be controlled.

In order for executing the surface treatment using the treatment apparatus 50, the substrate holding section 52 is made to hold the substrate 10A provided with the inorganic oriented film 15. Subsequently, the reaction gas supply section 53 evaporates the solution containing the first silane-coupling agent having the first alkyl group to generate the reaction gas, and then supplies the reaction gas into the reaction container 51. The first alkyl group contained in the reaction gas thus supplied is coupled to the surface of the inorganic oriented film 15, thus the organic film can be obtained. By controlling one or more of the concentration and the flow rate of the reaction gas thus supplied, the ambient temperature in the reaction container 51, and the treating time, it is possible to control the coverage factor of the organic film covering the inorganic oriented film 15.

Figure 3B:
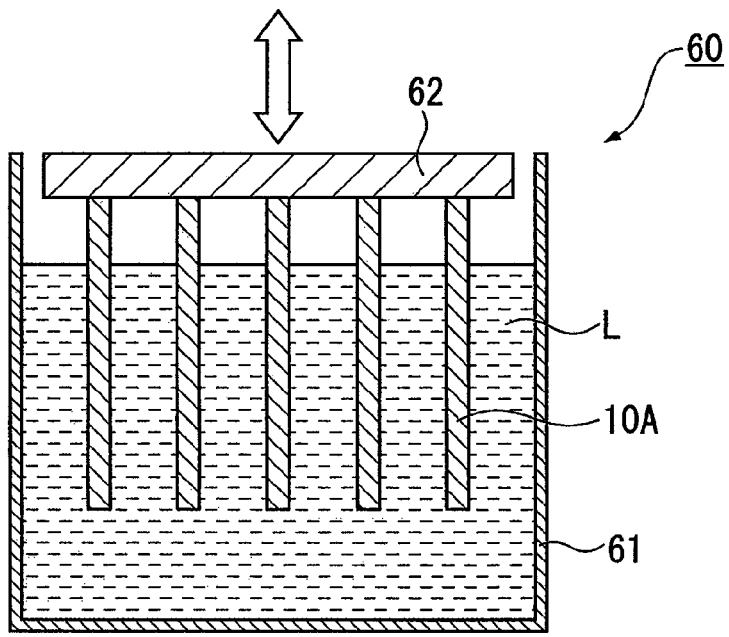
FIG. 3B is a schematic diagram showing a surface treatment method using a liquid-phase method.

FIG. 3B is a schematic diagram showing a surface treatment method using the liquid-phase method. Here, an example of executing the surface treatment using the treatment apparatus 60 shown in FIG. 3B will be explained. The treatment apparatus 60 is provided with a dipping bath 61 and a substrate holding section 62. The substrate holding section 62 is provided with a moving member (not shown) for holding the processed substrate and taking the processed substrate out from and putting it into the dipping bath 61, and it is arranged that the moving member can control the moving speed (pulling-up speed) of the processed substrate.

In order for executing the surface treatment using the treatment apparatus 60, the solution L containing the first silane-coupling agent has previously been reserved in the dipping bath 61, and then the substrate holding section 62 is made to hold the transparent substrate 10A provided with the inorganic oriented film 15. Subsequently, the transparent substrate 10A is dipped into the solution L reserved in the dipping bath 61 by the moving member, and then held in this state for a predetermined period of time. Then, the transparent substrate 10A is pulled up by the moving member at a predetermined pulling-up speed, thereby obtaining the organic film. By controlling one or more of the molar quantity of the first silane-coupling agent in the solution L, the pulling-up speed, the dipping time, and the number of times of dipping, it is possible to control the coverage factor of the organic film covering the inorganic oriented film 15.

In the surface treatment using the gas-phase method or the liquid-phase method, as the solvent of the solution containing the first silane-coupling agent, there can be cited, for example, an aromatic solvent, a long-chain alkyl solvent, an alicyclic hydrocarbon solvent, and a halogen-containing solvent. By using a nonaqueous solvent, it is possible to prevent the reaction between the first silane-coupling agent and water from occurring prior to the surface treatment, thus deterioration of the first coupling agent can be prevented.

In the present embodiment, the organic film (a monomolecular film) 16a is formed by executing the surface treatment using the gas-phase method shown in FIG. 3. Specifically, hexyltrimethoxysilane is used as the first silane-coupling agent, and nitrogen is used as the carrier gas. The flow rate of the reaction gas is set to be 10 sccm, and the flow rate of the carrier gas is set to be 5000 sccm. Then, the treatment is executed at a treatment temperature of 160° C. for 2 hours, thereby obtaining the organic film 16a. Here, the first alkyl group 161a is coupled up to the saturated amount, thereby forming the organic film 16a almost entirely covering (with the coverage factor of about 100%) the surface of the inorganic oriented film 15.

Figure 2C:
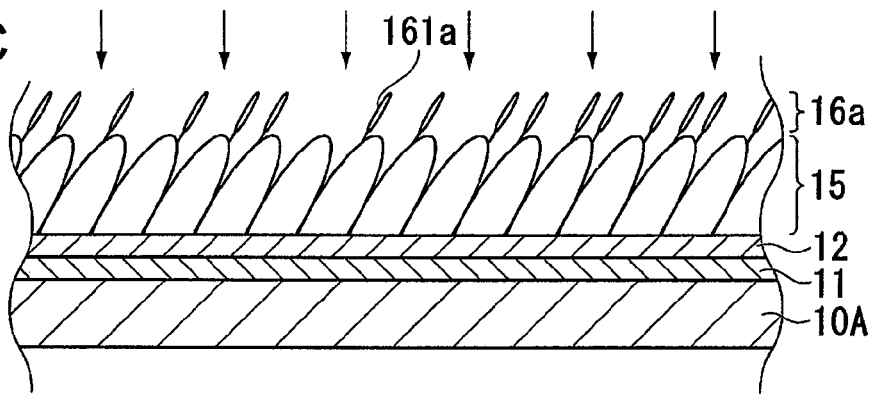

Subsequently, as shown in FIG. 2C, a part of the organic film 16a is removed, and at the same time the amount of the removal is controlled, thereby forming the first organic film with a predetermined coverage factor (a removal process). As the method of removing a part of the organic film 16a, there can be cited a method of irradiating the organic film 16a with an ultraviolet ray, a method of exposing the organic film 16a to an ozone atmosphere, a method of exposing the organic film 16a to a plasma atmosphere, and so on.

In the case of adopting the method of irradiating the organic film with the ultraviolet ray, the amount of removal can be controlled by controlling at least one of the intensity of the ultraviolet ray and the irradiation time thereof. In the case of adopting the method of exposing the organic film to the ozone atmosphere, the amount of removal can be controlled by controlling at least one of the gas concentration of the ozone atmosphere and the period of time during which the organic film is kept exposed to the ozone atmosphere. In the case of adopting the method of exposing the organic film to the plasma atmosphere, the amount of removal can be controlled by controlling at least one of the plasma density of the plasma atmosphere and the period of time during which the organic film is kept exposed to the plasma atmosphere.

When either one of the methods is adopted, since which of the first alkyl groups 161a constituting the organic film 16a are removed is determined by the probability, the portions of the inorganic oriented film 15 covered by the first organic film thus formed become to be distributed in a random manner. Here, the organic film 16a is exposed to the ozone atmosphere, and at the same time, irradiated with the ultraviolet ray, thereby removing a part of the organic film 16a. For example, an excimer laser with a wavelength of 172 nm is used as the ultraviolet ray to be applied, and the treatment time is set to be about one minute.

Figure 2D:
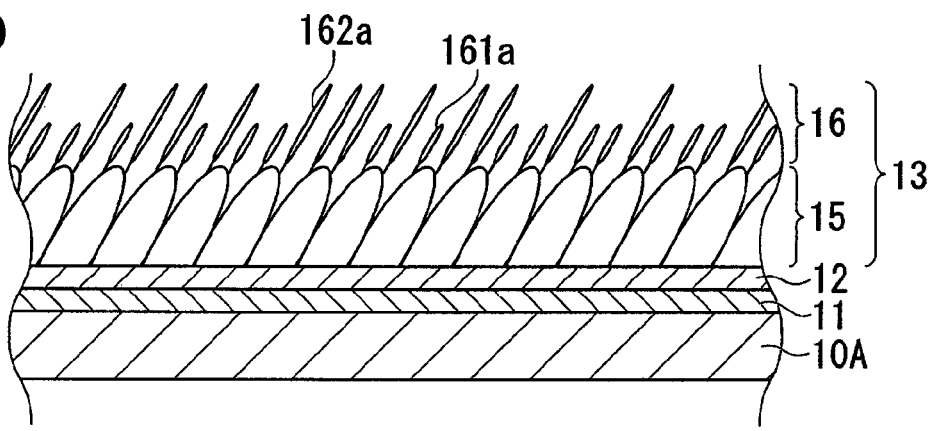

Subsequently, as shown in FIG. 2D, the second alkyl group 162a is coupled to the portions of the inorganic oriented film 15 exposed by removing the organic film 16a therefrom. Specifically, by executing the surface treatment with the second silane-coupling agent containing the second alkyl group 162a, the second alkyl group 162a is coupled selectively to the portions thus exposed. As the surface treatment, either of the liquid-phase method or the gas-phase method described above can be used. Here, the second alkyl group 162a is coupled by the gas-phase method using octadecyltrimethoxysilane as the second silane-coupling agent.

As described above, there is formed the organic section 16 composed of the first organic film made of the first alkyl group 161a and the second organic film made of the second alkyl group 162a. Thus, the first oriented film 13 composed of the inorganic oriented film 15 and the organic section 16 can be obtained. Further, by providing the polarization plate 14 on the opposite side of the transparent substrate 10A to the first oriented film 13, and executing other processes, the element substrate 10 shown in FIG. 1 can be obtained.

Further, the opposed substrate 20 is formed separately from the element substrate 10. For example, the common electrode 21 is formed on the transparent substrate 20A, and then the second oriented film 22 is formed on the common electrode 21 in the same manner as the first oriented film 13. Further, by providing the polarization plate 23 on the opposite side of the transparent substrate 20A to the second oriented film 22, and executing other processes, the opposed substrate 20 can be obtained.

Subsequently, the element substrate 10 and the opposed substrate 20 are bonded to each other so that the first oriented film 13 and the second oriented film 22 are located medially, the liquid crystal layer 30 is encapsulated between the element substrate 10 and the opposed substrate 20, and some other processes are executed, thereby obtaining the liquid crystal device 1 shown in FIG. 1.

According to the manufacturing method as described above, since the first organic film with a predetermined coverage factor is formed by forming the organic film 16a with a coverage factor of about 100%, and then partially removing the organic film 16a, it is possible to form the organic section 16 having a predetermined ratio between the first alkyl group 161a and the second alkyl group 162a. Thus, since it is possible to provide a desired characteristic to the organic section 16, and the first oriented film 13 has a characteristic obtained by considering the characteristic of the organic section 16 and the characteristic of the inorganic oriented film 15, the first oriented film 13 with a desired characteristic can be formed. Therefore, it is possible to form the first oriented film 13 capable of controlling the orientation of the liquid crystal layer 30 with high accuracy in accordance with the characteristic required to the device to which the liquid crystal device is applied, thus the preferable liquid crystal device 1 capable of configuring a high performance device can be manufactured.

It should be noted that although in the embodiment described above, the first organic film with a predetermined coverage factor is formed by forming the organic film 16a with the coverage factor of about 100%, and then executing the removal process, it is also possible to form the first organic film without executing the removal process by controlling the coverage factor by controlling the treatment conditions of the surface treatment. According to this method, since the removal process is not executed, the productivity can be improved. Further, although in the embodiment described above the first and second organic films are formed by executing the surface treatment using the gas-phase method, the liquid-phase method can also be used instead. According to the liquid-phase method, the productivity can dramatically be improved compared to the gas-phase method, and further, the cost of the treatment apparatus can also be reduced. Further, it is also possible that the first organic film is formed using the liquid-phase method, and the second organic film is formed using the gas-phase method, that the first organic film is formed using the gas-phase method, and the second organic film is formed using the liquid-phase method, or that the first and second organic films are both formed using the liquid-phase method.

Further, it is also possible to execute a pretreatment for activating the surface of the inorganic oriented film 15 prior to the execution of the surface treatment for forming the first organic film or the second organic film. As the pretreatment, a treatment for providing the hydroxyl group to the surface of the inorganic oriented film 15 can be cited. Thus, the coverage, the stability, and the reproducibility can be improved.

Further, it is also possible to form an oriented film having an organic section composed of three or more types of alkyl groups using three or more types of silane-coupling agents. For example, it is also possible that the organic section 16 shown in FIG. 2D is formed, and then removed partially in the same manner as the embodiment described above, and then the third alkyl group is coupled on the inorganic oriented film exposed by the removal. On this occasion, it is also possible to couple the third alkyl group by executing either one of the surface treatment using the liquid-phase method and the surface treatment using the gas-phase method. By controlling the amount of removal of the organic section 16, the proportion between the first alkyl group, the second alkyl group, and the third alkyl group can be controlled.

What is claimed is:

1. A method of manufacturing a liquid crystal device provided with a liquid crystal layer held between a pair of substrates opposed to each other, and an oriented film disposed between at least one of the substrates and the liquid crystal layer, the method comprising:
   (a) providing an inorganic oriented film to the one of the substrates;
   (b) forming a first organic film with a first silane-coupling agent, the first organic film randomly covering a surface of the inorganic oriented film with a predetermined coverage factor smaller than 1, step (b) further includes:
      (b1) reacting the first silane-coupling agent with the surface;
      (b2) partially removing an organic film formed in step (b1) to form the first organic film; and
      (b3) controlling a treatment condition in step (b2) to control an amount of removal, thereby setting the predetermined coverage factor of the organic film; and
   (c) forming, after step (b), a second organic film with a second silane-coupling agent having a carbon number different from a carbon number of the first silane-coupling agent, the second organic film covering the surface exposed from the first organic film, wherein
   the oriented film composed mainly of the first organic film, the second organic film, and the inorganic film is formed.

2. The method of manufacturing a liquid crystal device according to claim 1, wherein
   in step (b2), the organic film is irradiated with an ultraviolet ray to partially remove the organic film, and at least one of irradiation intensity of the ultraviolet ray and irradiation time of the ultraviolet ray is controlled, thereby controlling the amount of the removal.

3. The method of manufacturing a liquid crystal device according to claim 1, wherein
   in step (b2), the organic film is exposed to an ozone atmosphere to partially remove the organic film, and at least one of gas concentration of the ozone atmosphere and a period of time during which the organic film is exposed to the ozone atmosphere is controlled, thereby controlling the amount of the removal.

4. The method of manufacturing a liquid crystal device according to claim 1, wherein
   in step (b2), the organic film is exposed to a plasma atmosphere to partially remove the organic film, and at least one of plasma density of the plasma atmosphere and a period of time during which the organic film is exposed to the plasma atmosphere is controlled, thereby controlling the amount of the removal.

5. The method of manufacturing a liquid crystal device according to claim 1, wherein
   in step (b1), the first silane-coupling agent is reacted with the surface using a liquid-phase method.

6. The method of manufacturing a liquid crystal device according to claim 1, wherein
   in step (b1), the first silane-coupling agent is reacted with the surface using a gas-phase method.

* * * * *